Figure 1:
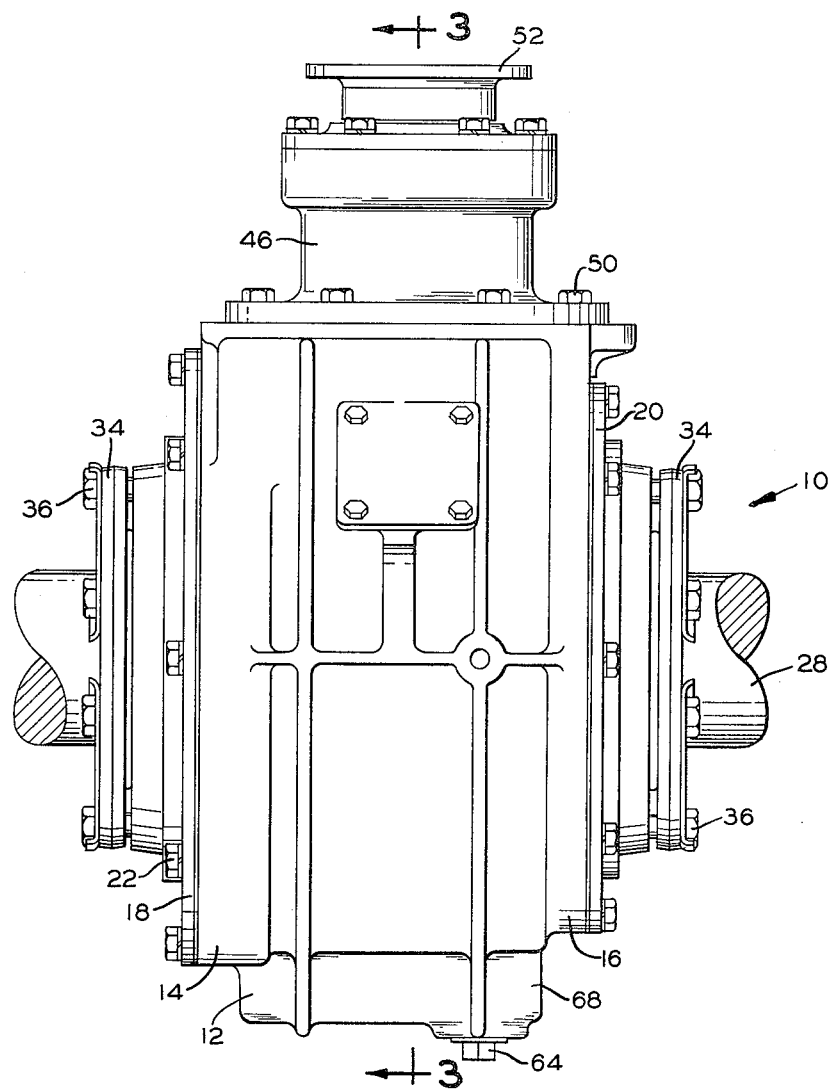

Dec. 22, 1964 G. R. REED 3,162,269
LUBRICATION ARRANGEMENT FOR A RAIL CAR AXLE DRIVE
Filed June 7, 1962 3 Sheets-Sheet 1

Dec. 22, 1964   G. R. REED   3,162,269
LUBRICATION ARRANGEMENT FOR A RAIL CAR AXLE DRIVE
Filed June 7, 1962   3 Sheets-Sheet 2

Dec. 22, 1964  G. R. REED  3,162,269
LUBRICATION ARRANGEMENT FOR A RAIL CAR AXLE DRIVE
Filed June 7, 1962  3 Sheets-Sheet 3

United States Patent Office 3,162,269
Patented Dec. 22, 1964

3,162,269
LUBRICATION ARRANGEMENT FOR A RAIL
CAR AXLE DRIVE
George Raymond Reed, Lambertville, Mich., assignor, by mesne assignments, to Safety Electrical Equipment Corporation, Hamden, Conn., a corporation of Connecticut
Filed June 7, 1962, Ser. No. 200,873
14 Claims. (Cl. 184—6)

This invention relates to axle drive mechanisms of the type wherein a gear casing surrounds a rail car axle and contains gearing through which drive is imparted to the axle, the gearing being driven from a propeller shaft or the like connected to a suitable prime mover, and more particularly to a lubrication arrangement therefor.

The usual axle drive unit includes a driving sleeve or quill telescopically mounted for unitary rotation on the axle between the wheels driven thereby. The sleeve is rotatably mounted in a surrounding gear casing with suitable lubricating retaining seals interposed therebetween. A ring gear is drivingly secured to the quill and is in turn driven by a pinion gear which has an integral shaft portion thereof rotatably mounted in the gear case with lubricant retaining seals interposed therebetween. The sump of the case is supplied with lubricant means for directing lubricant where necessary.

Modern day usage of rail car axle drives requires the same to transmit high torque loads at very high speeds. Even with the common spur or helical gears, high torque loads and speeds result in lubrication problems; while, with the ring and pinion gears used in axle drive units to obtain a high reduction right angle drive, the problem of properly lubricating the same is of extreme importance. This problem arises due to the high gear reduction since the pinion gear at vehicle cruising speed will rotate very rapidly, and also due to the offset between the pinion and ring gear when using hypoid gears, a great tendency to wear is also inherent, especially on the pinion gear which has relatively few teeth when compared to the ring gear.

Prior art rail car axle drives have provided means for lubricating the gears and bearings therein. The usual means merely relies upon the ring gears action when revolving to throw the lubricant from the sump in the bottom of the gear case onto the various elements of the unit. This arrangement leaves much to be desired, for the lubricant often is not directed where needed and/or in the required volume.

It is, therefore, an object of this invention to provide a lubrication arrangement for a rail car axle drive unit wherein a substantial flow of lubricant is directed to the desired locations.

It is another object of this invention to provide such a drive unit wherein means are provided to utilize the action of the ring gear to provide an adequate and properly directed flow of lubricant.

A further object of this invention is to provide means in the case of the rail car axle drive unit whereby the rotating ring gear will carry an adequate supply of lubricant from the sump of the case and deposit the same in the desired location.

It is yet another object of this invention to provide such a unit which is simple and inexpensive to construct and yet durable in operation.

Figure 2:
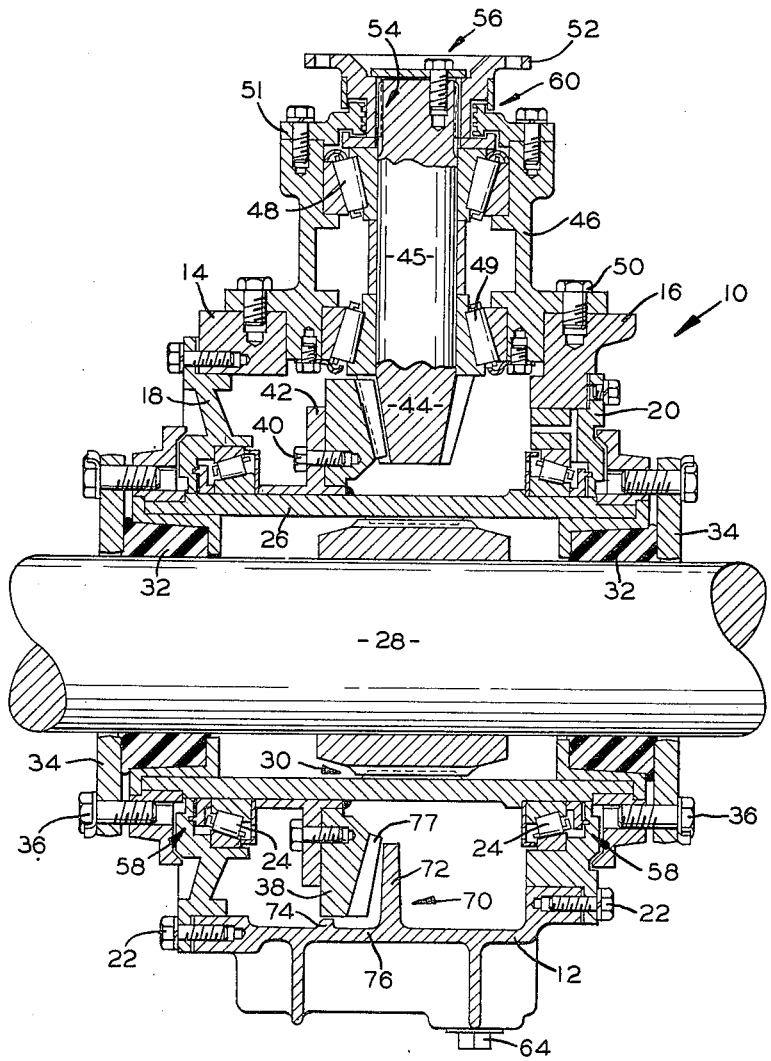
Figure 5:
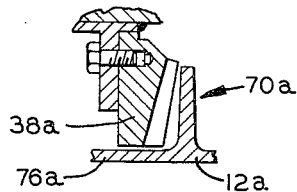
Figures 6, 7:
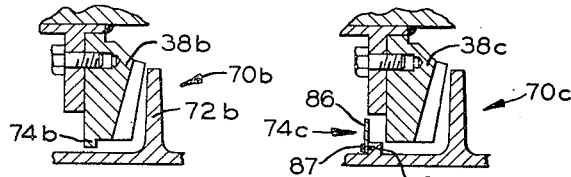
Figure 3:
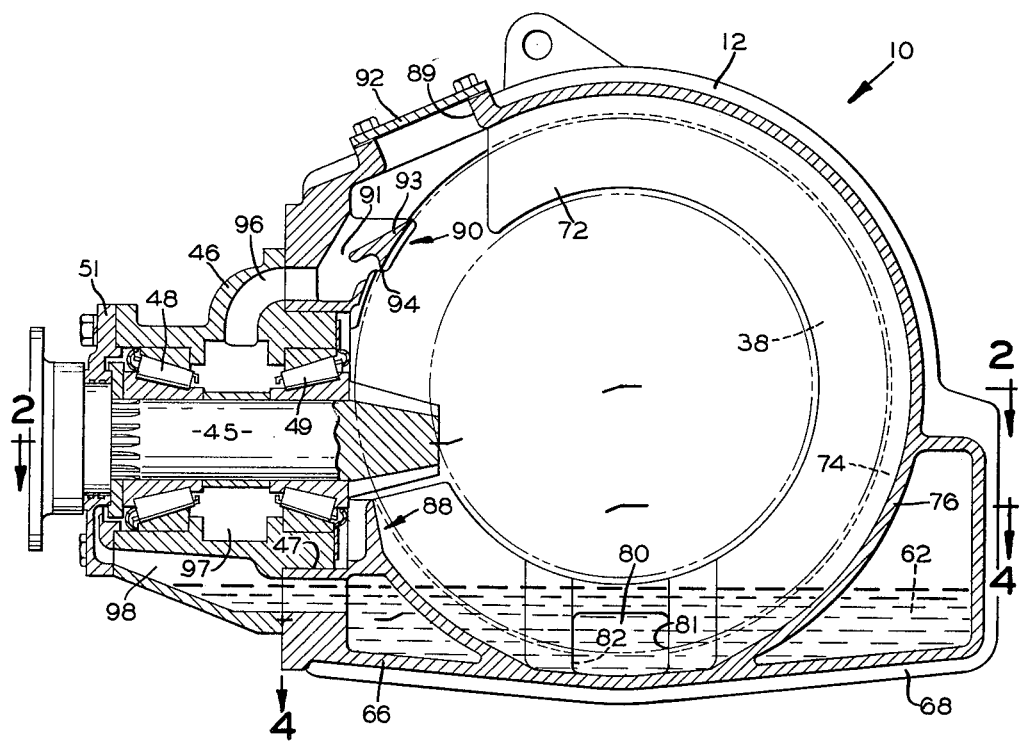
Figure 4:
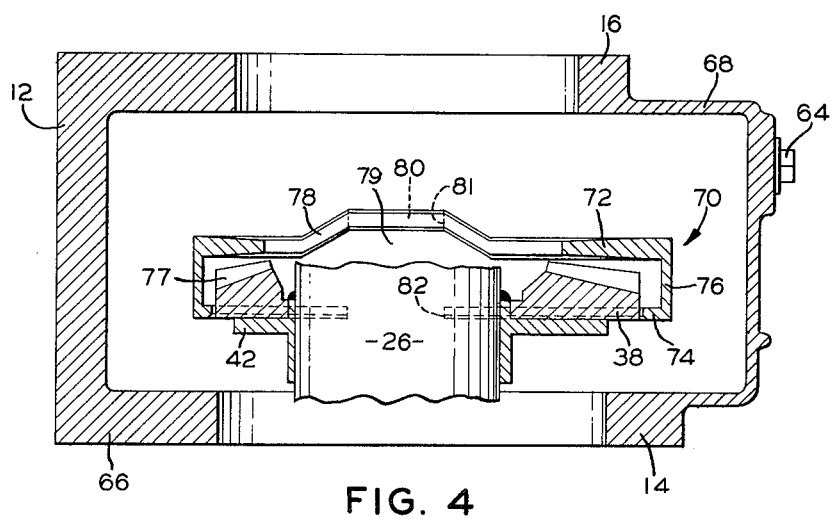

Other and further objects of this invention will become apparent upon a consideration of the specification when taken in view of the following drawings wherein:

FIG. 1 is a plan view of a rail car axle drive unit;
FIG. 2 is a sectional view of the unit of FIG. 1 taken along the line 2—2 in FIG. 3;
FIG. 3 is a sectional view taken along the lines 3—3 in FIG. 1 with certain parts omitted for added clarity;
FIG. 4 is a sectional view of the gear case of FIG. 1 taken along the line 4—4 in FIG. 3 with certain parts omitted for added clarity; and
FIGS. 5, 6 and 7 are views of a portion of other embodiments of the lubricating arrangement of this invention.

In one preferred embodiment of this invention, a rail car axle drive unit, including a quill adapted to be mounted on an axle, a ring gear mounted for unitary rotation on the quill, a pinion gear drivingly engaging the ring gear, and a gear case surrounding the gears and quill and rotatably mounted the same, has a lubricant carrying sump formed in the lower regions of the gear case. The level of the lubricant is normally maintained below the locations of the pinion-to-case and quill-to-case seals so that leaking is avoided, while the lower portion of the ring gear depends below the lubricant level.

The usual unit merely relies on the rotation of the ring gear to carry lubricant from the sump and deposit the same inter alia, on the meshing location of the ring gear and pinion gear and upon the pinion gear bearings. Since the pinion normally projects horizontally into the gear case at, or offset slightly, from the vertical midpoint thereof, in one direction of ring gear rotation the lubricant need only be carried a short distance above its normal level to reach the meshing location of the ring and pinion gears and the location of the pinion bearings rotatably mounting the same in the case; however, upon ring gear rotation in the opposite direction, the ring gear must carry the lubricant approximately 180° before the meshing and the pinion bearing locations are reached. Rail car drive units, unlike the usual automotive drive units, are operated substantially equal time in forward and reverse.

In view of the above reversing problem and since at high ring gear speeds the lubricant is quickly thrown from the ring gear, this invention contemplates means for maintaining the lubricant on the ring gear so that the lubricant is directed to the selected location in a sufficient quantity. This means comprises a substantially continuous annular channel extending above and below the lubricant level. The ring gear is adapted to rotate in this channel and by means of the channel lubricant is retained on the ring gear after it has rotated above the level of the lubricant. Below the lubricant level, the channel is adapted so that it does not interfere with the free co-mingling of the lubricant in the sump and is also adapted so that the lubricant in the sump may easily gain access to the ring gear.

Referring now to the drawings, a rail car drive unit shown generally at 10 includes a gear case 12 having opposed lateral end faces 14 and 16 to which end covers 18 and 20 are secured respectively as by a plurality of bolts 22. The covers 18 and 20 are substantially annular in form and each carries an annular bearing 24 which rotatably mounts a laterally extending quill member 26.

The quill member 26 is drivingly mounted on a rail car axle shown fragmentarily at 28 by means of a spline engagement therebetween shown generally at 30; the axle 28 being adapted to drive a pair of rail engaging wheels (not shown). Interposed between the ends of the quill 26 and the axle 28 are a pair of spaced rubber bushings 32. Each bushing 32 is in association with a clamping ring 34 which engages the laterally outer end thereof and is secured to the quill 26 by bolts 36 thereby compressing the bushing into the recess between quill 26 and axle 28 where they serve to yieldingly couple the quill and axle together to permit limited relative movement therebetween and to absorb shock and vibration during operation.

A ring gear 38 is drivingly attached by a plurality of bolts 40 to an annular flange 42 formed integrally with or suitably secured to the quill 26. The ring gear 28 is constantly in mesh a pinion gear 44 having a shaft portion 45 rotatably mounted in a bearing and pinion housing 46 by means of a pair of spaced bearings 48 and 49 interposed therebetween. The housing 46 is secured to the case 12 at a pinion receiving opening 47 therein by a plurality of bolts 50 and has a bearing cap 51 bolted to the outer end thereof to retain the pinion 44 and the bearing 48 and 49 in proper position. A flange 52 is drivingly connected to the external end of the pinion shaft 45 by a spline engagement shown generally at 54 and suitably secured thereto as by a bolt and washer shown at 56. The flange 52 is adapted to be secured to and driven by a prime mover through a suitable drive line (not shown).

The ring and pinion gears 38 and 44 disclosed are of the hypoid type and therefore the axis of the pinion and the meshing point is offset below the center of the ring gear. However, the type of ring and pinion gears forms no part of this invention, and many types well known in the art may be used.

Means are provided to prevent the escape of lubricant from the drive unit 10. More particulary, a labyrinth type seal shown generally at 58 is provided between each cover 18 and 20 and its respective end of the quill 26, and a labyrinth type seal 60 is provided between the bearing cap 51 and the pinion shaft 45 and flange 52. The seals 58 and 60 are very efficient in preventing the passage of lubricant splash or spray; however, they will not function satisfactorily if the level of the lubricant is above the seal. Therefore, the level of the lubricant 62 is maintained at the base of an access plug 64 threadedly received in the case 12, which base is positioned below the level of the seals 58 and 60. Instead of being formed annularly, the case 12 has the lower fraction or portion thereof elongated longitudinally as at 66 and 68 to provide an adequate sump volume for containing a suitable supply of lubricant below the plug 64. The top of the case and the sump at the base of the case are maintained in close vertical proximity with the ring gear 38 to provide for maximum road and frame (not shown) clearance.

The rail car axle drive unit as so far described is substantially conventional in structure, and in operation a certain amount of lubricant 62 would be carried by the rotating ring gear 38 and dispersed throughout the unit 10. However, as viewed in FIG. 3, when the ring gear 38 is rotating counterclockwise, the lubricant 62 must be transported well in excess of 180° from its normal sump level before the same will be deposited upon the meshing position and the pinion bearings 48 and 49. This is not satisfactorily accomplished by the conventional unit since centrifugal force will disperse the lubricant from the ring gear 38 in a haphazard manner. Even when the ring gear 38 is rotating clockwise, the desired amount of lubricant will not reach the meshing position and the pinion bearings 48 and 49 before being dispersed from the ring gear.

Means are provided to insure that the lubricant 62 is carried by the ring gear 38 and deposited in substantial volumes at the desired locations. More particularly, a substantially continuous annular channel shown generally at 70 is formed in the case 12 concentrically with the ring gear 38 and positioned so that the ring gear 38 rotates therein. The channel 70 includes a first and a second projection or rib 72 and 74 extending radially inwardly from the base portion 76 interconnecting the same. For the greater majority of the channel 70, the base portion 76 consists of a part of the main wall of the case 12; however, in the vicinity of the longitudinally extending fractions 66 and 68 of the case 12 (as clearly shown in FIG. 4), the portion 76 is formed separately so that the lubricant 62 may flow freely past the channel 70 between the fractions 66 and 68 and the remainder of the unit 10. At these fractions 66 and 68, if the portion 76 of the channel 70 followed the contour of the case, the channel 70 would be substantially displaced from the ring gear reducing its operativeness and additionally, the rib 72 extending radially inwardly therefrom would function as a dam and prevent the free lateral flow of lubricant within the unit 10.

The rib 72 extends radially inwardly from the portion 76 to substantially the inner end of the teeth 77 of the ring gear 38 and for the greater circumferential part of the channel 70 is juxtaposed and closely spaced relative to the teeth 77. In the circumferentially lower portion of the channel 70, the rib 72 is displaced concavely at 78 with respect to the ring gear 38 so as to form a pocket 79 therebetween for gathering lubricant 62 to be subsequently carried by the ring gear, and the channel 70 is provided with a laterally extending passageway 80 including openings 81 and 82 through the ribs 72 and 74 respectively to allow for lateral movement of the lubricant 62 in the sump of the unit 10 and into the pocket 79.

The rib 74 extends radially inwardly from the portion 76 and is closely spaced relative to the periphery of the ring gear to form the lateral side of the channel 70 spaced from the rib 72 to inhibit the flow of lubricant 62 from the channel through the space between the portion 76 and the periphery of the ring gear 38. It should be noted that the rib 74 can be formed in a plurality of positions relative to the ring gear; the position, the radial depth, and lateral width of the rib 74 being determined mainly by the cross-sectional area and configuration desired for the channel 70.

As shown in FIG. 5, the rib 74 has been omitted entirely and the ring gear 38a closely approaches the portion 76a of the case 12a resulting in a channel 70a of smallest radial depth and the close spacing between the ring gear 38a and the portion 76a inhibits the flow of lubricant 62 between the ring gear 38a and the portion 76a; in FIG. 6, a rib 74b has been provided on the periphery of the ring 38b to form the side of the channel 70b spaced from the rib 72b; while in FIG. 7, the rib 74c is positioned rearwardly of the pinion gear 38c and has a base portion 84 formed integrally with the remainder of the channel 70c and a removable portion 86 secured thereto in a suitable manner as by bolts 87. The rib 74c is formed in two portions so that the ring gear 38c may be positioned in the channel 70c. The embodiment of the rib 74 shown in FIGS. 2–4 is most desirable, for this results in the least number of parts, that only the relative small lateral width of the inner diameter of the rib 74 need be held to a minimum finished tolerance, either by machining or casting, to accommodate the ring gear 38 in proper spaced relationship without interfering with the same and so that a sufficient volume of lubricant is carried by the periphery of the ring gear 38.

As viewed in FIG. 3, the channel 70 terminates circumferentially above and below the meshing portion and the pinion bearing positions. Immediately below the meshing position, the interconnecting portions 76 as shown at 88 is formed in closer relationship relative to the ring gear 38 than the balance of the interconnecting portions 76. When the ring gear 38 is rotating clockwise, or upwardly relative to the meshing position, this closer relationship tends to force the lubricant 62 in the channel 70 into the meshing teeth of the pinion and ring gears 44 and 38.

Above the meshing and pinion bearing positions, the channel 70 is shown terminating adjacent an inspection opening 89 formed in the case 12 and closed by a cover 92 suitably secured thereto. If desired, the channel 70 can also be formed on the inner surface of the cover 92 and thereby continue slightly further circumferentially than as shown in the drawings. Upon counterclockwise rotation of the ring gear 38 or downwardly relative to the meshing position, the lubricant 62 is carried downwardly from the termination of the channel 70 and deposited upon the meshing point.

Means are provided to direct a portion of the lubricant 62 carried by the rotating ring gear 38 to the position of the pinion bearing 48 and 49. More particularly, the case 12, above the pinion receiving opening 47, is provided with a boss 90 adapted to direct the flow of lubricant impinging the same into a channel 91 formed therein. The boss 90 has a portion thereof closely spaced relative to the periphery of the ring gear 38 with the upper surface 93 thereof adapted to direct lubricant flow into the channel 91 when the ring gear is rotating counterclockwise while the lower surface 94 thereof is adapted to direct the lubricant flow into the channel 91 when the ring gear is rotating clockwise.

The channel 91 is the boss 90 is confluent with a channel 96 formed in the housing 46. The channel 96 is in turn confluent with an annular chamber 97 formed in the housing 46 medially with respect with the bearings 48 and 49, which bearings, being of the tapered roller type, act as pumps when being lubricated and discharge the lubricant outwardly from the chamber 97. The lubricant discharge by the inner bearing 49 flows directly to the fraction 66 while that discharged by the outer bearing 48 flows through a channel 98 formed in the housing 46 and then into the fraction 66.

While several embodiments of this invention have been shown and described, it is apparent that there may be many changes in the structure and operation thereof without departing from the scope of this invention as defined by the appended claims.

What is claimed is:

1. The combination with a rail car drive unit of the type having a ring gear adapted to be drivingly connected to the axle of the rail car, a pinion gear drivingly meshed with the ring gear, and gear case means having a lubricant retaining sump and rotatably mounting the ring gear and pinion gear, of a channel means carried by said gear case means in close proximity to said ring gear, said ring gear being positioned within said channel means and said channel means extending above the lubricant level of said sump from below the same both clockwise and counterclockwise and terminating above and below the meshing points of said ring gear and pinion gear whereby lubricant is directed upon the meshing portion of the ring gear and pinion gear up one rotation of the ring gear both clockwise and counterclockwise.

2. The combination with a rail car drive unit of the type having a ring gear adapted to be drivingly connected to the axle of a rail car and operative to rotate clockwise and counterclockwise, a pinion gear drivingly meshed with the ring gear, and gear case means having a lubricant retaining sump and rotatably mounting the ring gear and pinion gear of channel means, at least a portion of which is formed integrally with said gear case means and including at least a base portion formed concentrically with said ring gear and surrounding at least a portion of the periphery thereof, and a first one piece rib portion formed integrally with and projecting radially inwardly from said base portion juxtaposed the teeth of said ring gear, said rib portion extending circumferentially from below the level of lubricant in the sump of said case both counterclockwise and clockwise above the level and terminating on opposed sides of the meshing points of said ring gear and pinion gear whereby said channel means insures that lubricant is carried by said ring gear from said sump and deposits said lubricant in the meshing of said ring gear and pinion gear upon rotation of said ring gear both clockwise and counterclockwise.

3. The combination defined in claim 2 wherein a portion of said first rib portion below the level of lubricant in said sump is formed concavely with respect to said ring gear to form a lubricant receiving pocket therebetween.

4. The combination defined in claim 2 wherein said channel means includes a second radially extending rib portion spaced laterally from said first rib portion, said second rib portion inhibiting the flow of lubricant out of said channel in the space between said ring gear and said base portion and carried by one of the same.

5. A lubricating arrangement for a unit adapted to drive a rail car axle comprising in combination, a ring gear adapted to be drivingly connected to a rail car axle, a pinion gear drivingly meshed with said ring gear, case means rotatably mounting said gears, said case means having at least top and bottom walls and longitudinally spaced end walls joining said top and bottom walls, at least a portion of said top and bottom walls being closely spaced in a vertical direction relative to the periphery of said ring gear, at least a lower portion of one of said end walls adjoining said bottom wall being longitudinally spaced at a greater distance from the periphery of said ring gear than the distance said closely spaced portion of said top and bottom walls are spaced from the periphery of said ring gear whereby the lower portion of said case means is longitudinally elongated, and channel means for retaining lubricant on said ring gear during the revolution thereof, said channel means including a base portion carried by said top and bottom case walls and means at least a portion of which projects radially from said base portion to a position juxtaposed a face of said ring gear, a segment of said base portion in the longitudinally elongated portion of said case means being spaced from an end wall of said case means whereby lubricant may flow between said base portion and said last mentioned wall of said case means.

6. A lubricant arrangement for a unit adapted to drive a rail car axle comprising in combination, a ring gear adapted to be drivingly connected to a rail car axle, a pinion gear drivingly meshed with said ring gear, case means rotatably mounting said gears, said case means having at least top and bottom walls and longitudinally spaced end walls joining said top and bottom walls, at least a portion of said top and bottom walls being closely spaced relative to the periphery of said ring gears, at least the lower portions of said end walls of said case means adjoining said bottom wall being longitudinally spaced at a greater distance from the periphery of said ring gear than the distance said closely spaced portion of said top and bottom walls are spaced from the periphery of said ring gear whereby the lower portion of said case means is longitudinally elongated, and channel means for retaining lubricant on said ring gear during the revolution thereof, said channel means including a base portion spaced from the periphery of said ring gear and means at least a portion of which project radially from said base portion to lie juxtaposed a face of said ring gear, a segment of said base portion at the elongated portion of said case means being spaced from the end walls of said case means whereby lubricant may flow between said base portion and said case means wall and, at least a segment of the balance of said base portion being formed as a unitary part of said case means whereby said channel means is carried by said case means.

7. A lubricant arrangement for a unit adapted to drive a rail car axle comprising in combination, a gear case adapted to surround a laterally extending axle, a laterally extending quill rotatably mounted in said gear case and being adapted to telescopically receive the axle in driving ralationship, a ring gear rotatably disposed in said gear case and surrounding said quill and being drivingly connected thereto, a pinion gear drivingly meshed with said ring gear and having shaft means extending longitudinally therefrom through and rotatably mounted in said gear case, sealing means disposed between said case and said quill and between said case and said shaft means, said gear case having at least top and bottom walls and longitudinally spaced end walls joining said top and bottom walls, at least a portion of said top and bottom walls being closely spaced in a vertical direction relative to the periphery of said ring gear, at least the lower portions of said end walls adjoining said bottom wall being longitudinally spaced at a greater distance from the periphery of said ring gear than the distance said closely spaced portion of said top and bottom walls are spaced from the periphery of said ring gear whereby the lower portion of said case is longitudinally elongated, at least a portion of the longitudinally elongated portion of said case being disposed below said sealing means and being adapted to serve as a lubricant retaining sump, and a channel means carried by said case and surrounding at least a portion of the periphery of said ring gear for maintaining lubricant on the same during the revolution thereof and directing the lubricant on the meshing points of said gears, said channel means extending circumferentially from below the level of the lubricant in the sump of said case both clockwise and counterclockwise above the level of the lubricant and terminating above and below the meshing points of said gears and including a base portion and a first and a second rib extending radially inwardly therefrom, said first rib being juxtaposed the teeth of said ring gear and said second rib being laterally spaced from said first rib and closely spaced relative to the periphery of said gear, a portion of said first rib below the lubricant level being formed concavely with respect to said ring gear to form a lubricant receiving pocket therebetween, and said channel means having a passage extending laterally therethrough below the lubricant level to allow the lubricant in said sump to flow laterally therein.

8. A combination defined in claim 7 wherein a segment of said base portion at the elongated portion of said gear case is spaced from the end walls of said gear case and at least a segment of the balance of said base portion is formed as a unitary part of said case wall whereby said base portion is carried by said case and lubricant in said sump may flow between said case and said base portion.

9. The combination defined in claim 7 wherein at the circumferential termination of said channel below the meshing points of said gears, said base portion radially more closely approaches the periphery of said ring gear to direct the flow of lubricant into the meshing of said gears upon upward rotation of said ring gear relative to the meshing of said gears.

10. The combination with a rail car drive unit of the type having ring gear adapted to be drivingly connected to the axle of the rail car, a pinion gear drivingly meshed with the ring gear, and gear case means having a lubricant retaining sump and rotatably mounting the ring gear and pinion gear, of a channel means carried by said gear case means in close proximity to said ring gear, said ring gear being positioned within said channel means and said channel means extending above the lubricant level of said sump from below the same and terminating above and below the meshing points of said ring gear and pinion gear, said channel means at the termination thereof below the meshing point of gears radially more closely approaching the periphery of said ring gear to direct the flow of and into the meshing of said gears upon upward rotation of said ring gear relative to the meshing of said gears, whereby lubricant is directed upon the meshing portion of the ring gear and pinion gear upon rotation of the ring gear both clockwise and counterclockwise.

11. The combination defined in claim 10 wherein a portion of said channel below the level of lubricant in said sump is formed concavely with respect to said ring gear to form a lubricant receiving pocket therebetween.

12. The combination defined in claim 10 wherein the portion of said channel below the lever of lubricant in said sump includes a passage extending laterally therethrough to allow lubricant to flow laterally in said case.

13. The combination with a rail car drive unit of the type having a ring gear adapted to be drivingly connected to the axle of the rail car, a pinion gear drivingly meshed with the ring gear, and gear case means having a lubricant retaining sump and rotatably mounting the ring gear and pinion gear, of a channel means carried by said gear case means in close proximity to said ring gear, said ring gear being positioned within said channel means and said channel means extending above lubricant level of said sump from below the same in terminating above and below the meshing point of said ring gear and pinion gear, means rotatably mounting said pinion in said case, and directing means for directing the flow of lubricant onto said mounting means, said directing means being carried by said case and being disposed between the above and below termination of said channel means and being operative to direct the flow of lubricant from said channel onto said mounting means upon clockwise and counterclockwise rotation of said ring gear.

14. A combination with a rail car drive unit of the type having a ring gear adapted to be drivingly connected to the axle of a rail car and operative to rotate clockwise and counterclockwise, a pinion gear drivingly meshed with the ring gear, a gear case means having a lubricant retaining sump and rotatably mounting the ring gear and pinion gear, a channel means carried by said gear case means and including at least a base portion formed concentrically with said ring gear and surrounding at least a portion of the periphery thereof, and first and second rib portions, said first rib portion projecting radially inwardly from said base portion juxtaposed the teeth of said ring gear and said second rib portion is carried by said ring gear and extends radially outwardly therefrom and is closely spaced relative to said base portion and is spaced laterally from said first rib portion and inhibiting the flow of lubricant out of said channel in the space between said ring gear and said base portion, said first rib portion extending circumferentially above from below the level of lubricant in the sump of said gear case means both counterclockwise and clockwise above the level of lubricant and terminating on opposed sides of the meshing point of said ring gear and pinion gear, whereby said channel means insures that lubricant is carried by said ring gear from said sump and deposits said lubricant in the meshing of said ring gear and pinion gear upon rotation of said ring gear both clockwise and counterclockwise.

References Cited in the file of this patent

UNITED STATES PATENTS

| | | |
|---|---|---|
| 1,396,025 | Dahlquist | Nov. 8, 1921 |
| 2,240,118 | Matthews | Apr. 29, 1941 |
| 2,389,137 | Buckendale | Nov. 20, 1945 |
| 2,714,428 | Green | Aug. 2, 1955 |
| 2,862,458 | Lewis | Dec. 2, 1958 |

UNITED STATES PATENT OFFICE
CERTIFICATE OF CORRECTION

Patent No. 3,162,269                  December 22, 1964

George Raymond Reed

It is hereby certified that error appears in the above numbered patent requiring correction and that the said Letters Patent should read as corrected below.

Column 2, line 12, for "mounted" read -- mounting --; column 3, line 7, for "bearing" read -- bearings --; line 21, for "particulary" read -- particularly --; column 4, line 34, after "ring" insert -- gear --; column 5, line 10, for "is", first occurrence, read -- in --; line 40, for "up one" read -- upon --; column 6, line 1, for "lubricating" read -- lubricant --.

Signed and sealed this 18th day of May 1965.

(SEAL)
Attest:

ERNEST W. SWIDER
Attesting Officer

EDWARD J. BRENNER
Commissioner of Patents